Figure 1:
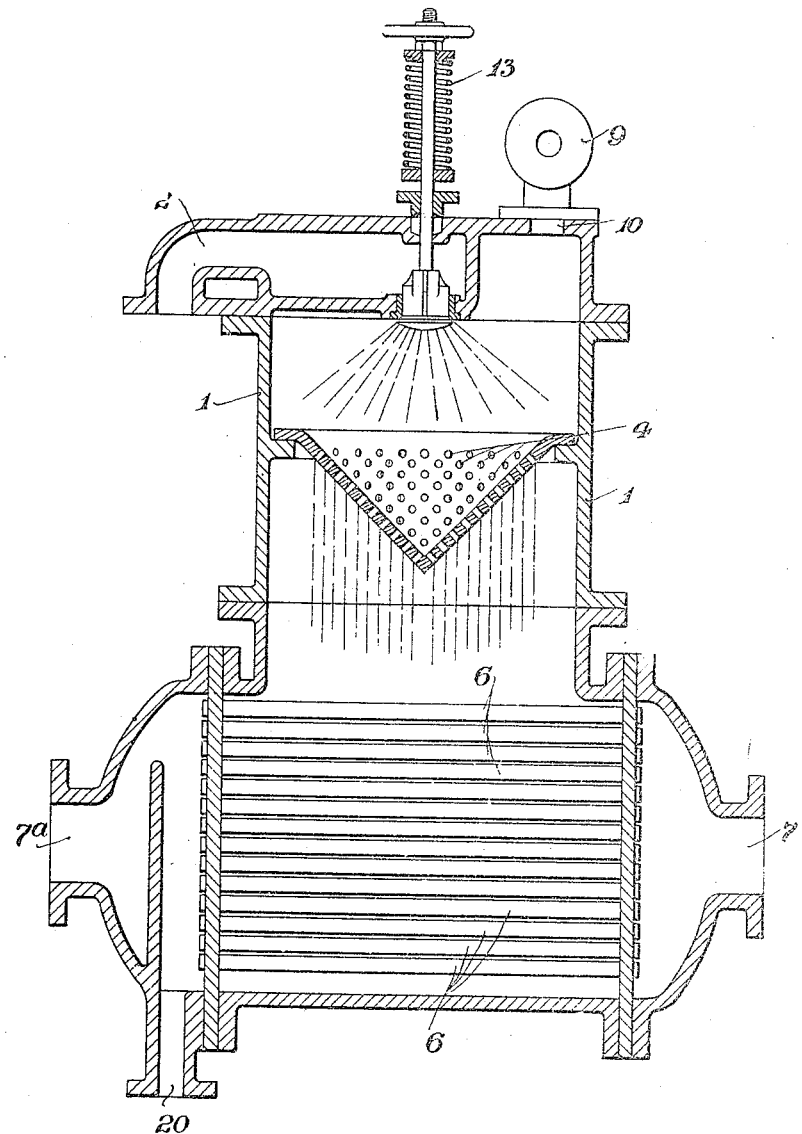

H. FOTHERGILL.
APPARATUS FOR REMOVING GASES FROM LIQUIDS.
APPLICATION FILED DEC. 27, 1921.

1,416,632.  Patented May 16, 1922.
3 SHEETS—SHEET 1.

INVENTOR:
HARRY FOTHERGILL
by Spear, Middleton, Donaldson & Hall.
Attys.

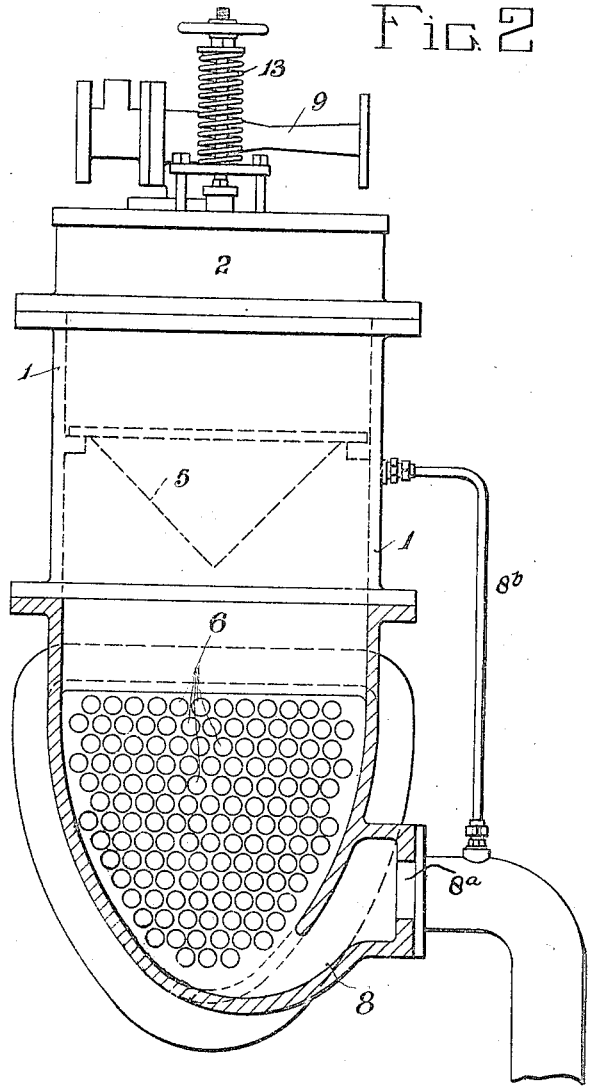

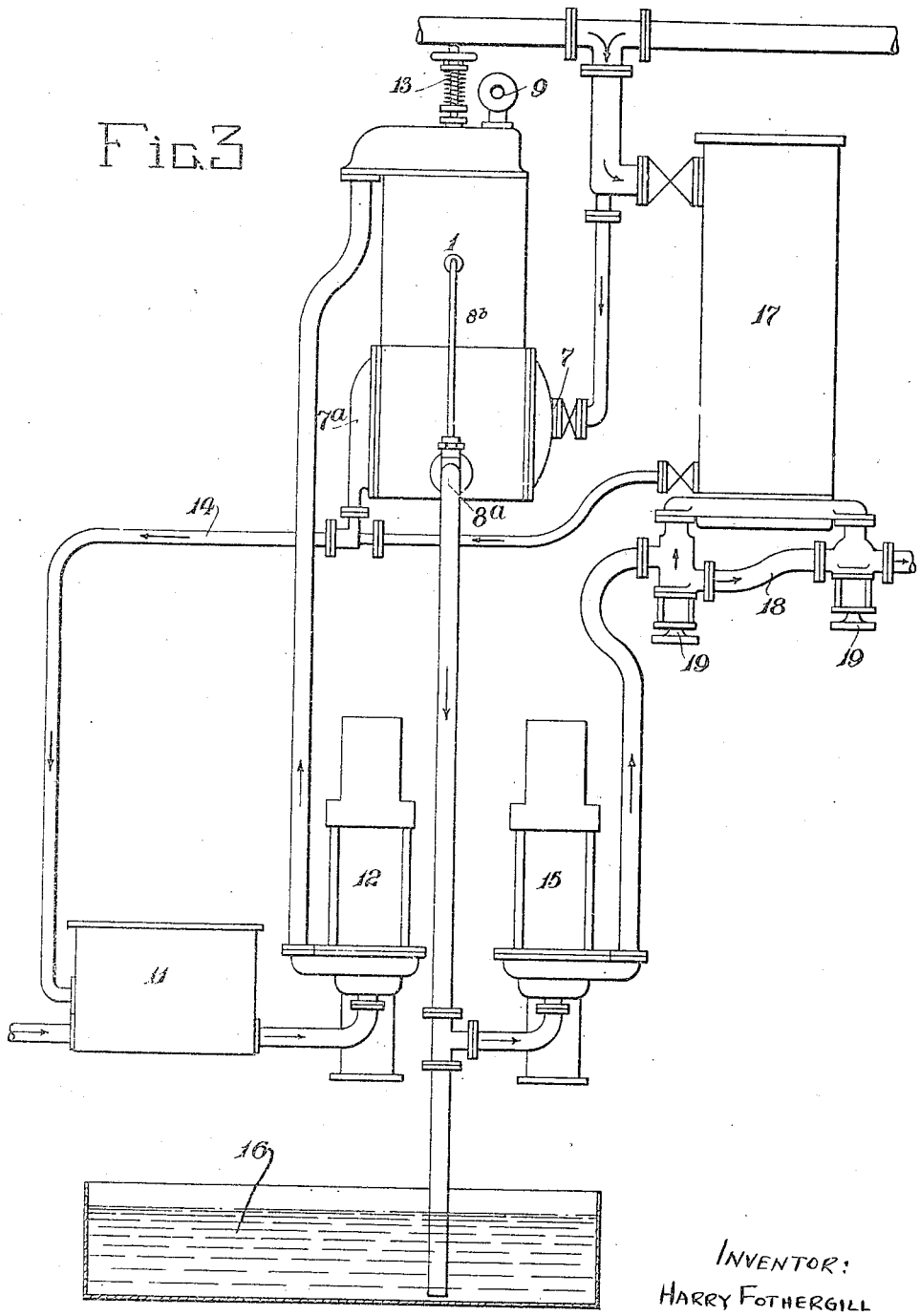

UNITED STATES PATENT OFFICE.

HARRY FOTHERGILL, OF LONDON, ENGLAND.

APPARATUS FOR REMOVING GASES FROM LIQUIDS.

1,416,632.                 Specification of Letters Patent.       Patented May 16, 1922.

Application filed December 27, 1921. Serial No. 524,334.

*To all whom it may concern:*

Be it known that I, HARRY FOTHERGILL, of 3 Central Buildings, London, in the county of Middlesex, England, engineer, have invented certain new and useful Improvements in Apparatus for Removing Gases from Liquids, of which the following is a specification.

This invention relates to apparatus for removing gases from liquids, and is particularly suitable for the removal of air from boiler feed water.

The invention has reference to that type of apparatus wherein the liquid to be deaerated or degassed is subjected to the action of heat in a vessel from which the liberated air or gas escapes or is extracted.

The primary feature of the present invention is the provision within a vessel of a surface or surfaces heated from an external source, the arrangement being essentially such that the liquid to be degassed or deaerated is sprayed and projected on to the heated surface or surfaces within the vessel, means being provided for extracting or permitting the escape of the liberated air.

Apparatus in accordance with my invention consists, therefore, of a vessel having an upper part into which the liquid to be degassed is introduced by projecting the liquid in the form of a spray, means for heating said liquid therein by a surface or surfaces within the lower part of the vessel heated from an external source and against which the liquid is projected in the form of a spray or shower, means for withdrawing or permitting the escape of the liberated air or gas, and an outlet for the deaerated or degassed liquid. When desired, means such as an ejector or a connection to some low pressure system, may be provided, whereby the pressure within the vessel can be reduced.

In apparatus of the kind referred to the liquid can be introduced into the upper part of the vessel in the form of a spray or shower so as to condense any vapour from the heated liquid and prevent it from escaping with the liberated gas which passes through the spray or shower to an outlet. Further, by the use of surface contact for heating purposes, any convenient medium, such as steam containing oil, or dirty hot gases, may be used for raising the temperature of the liquid for the purpose of liberating the gas without its impurities coming into contact with, or affecting the liquid in any way.

In the accompanying drawings I have illustrated invention:—

Fig. 1 being a sectional elevation of a degassing or deaerating vessel suitable for deaerating water intended for boiler feed purposes, constructed and adapted to operate in accordance with my invention.

Fig. 2 is an elevational view thereof partly in section, the plane of the section being at right angles to that of Fig. 1, while Fig. 3 is a diagrammatic view illustrating the application of my invention to the condensing and feed water supply system of a steam ship.

Referring to these drawings the numeral 1 designates the degassing or deaerating vessel. This vessel comprises a chamber or branch 2 at the top, from which the feed water is introduced into the vessel in the form of a spray or screen, covering the entire cross section of the upper vessel or passage 3 communicating between the upper and lower parts of the vessel as a whole. After the water has been introduced in the form of spray or screen for the purpose hereinbefore described, it is uniformly distributed over tubular heating surfaces in the lower part of the vessel for instance, by passage through suitable perforations 4 in the conical partition 5. The heating surface or surfaces may conveniently consist of a number of horizontal tubes 6 conveniently arranged in the lower part of the vessel, through which tubes steam is passed from the inlet 7 for the purpose of heating the water and liberating the air. When the heating steam supply is likely to be greater than that required for heating the water in the deaerating vessel, a surplus steam outlet 7$^a$ is provided, the condensed water being discharged from the branch 20 as shown on the drawing. The feed water sprayed into the vessel 1, is caused to fall over the hot surface in a broken state in order to promote rapid heating, and the water discharge passage 8 is preferably led upwardly a short distance above the base of the vessel, in order to seal the water outlet 8$^a$ from the vessel and provide for final heating by submerging the lower tubes so that the surface of the water within the vessel will be quiescent and the tendency for residual air to be entrained by the outflowing water will be obviated.

It may be found advantageous to provide a pipe or connection 8$^b$ leading from the water outlet 8$^a$ to a position beneath the water screen so that any vapour in the outlet pipe will be delivered to and condensed within the deaeration vessel. Suitable means can be provided for producing a partial vacuum in the deaerating vessel in order to promote rapid deaeration of the feed water and in the construction being described I propose to employ a small steam operated ejector 9 withdrawing from an outlet 10 in the top of the vessel 1 and producing a partial vacuum in the vessel, this ejector also operating as the means for discharging the air liberated from the feed water.

In order to clearly understand the operation of my invention reference should be made to Fig. 3 of the drawings which illustrates, by way of example, one form of application to the boiler feed water system of a steam ship. Condensate discharged from the condenser is delivered to a filter or feed tank 11, which also receives drainage and feed make up water. From this filter or tank 11 the water is delivered by a hotwell or other suitable pump 12 to the deaerating vessel into which it is sprayed under the pump pressure through a suitably loaded valve 13.

The steam for heating the water in the deaerating vessel is supplied from the auxiliary exhaust steam system, and the condensate from the heating tubes 6 can be led through a pipe 14 to the filter or feed tank 11, such pipe, or another pipe when desired, being arranged of sufficient size to provide for a supply of steam from the tubes for direct contact heating in the filter or feed tank. The feed water outlet 8" from the deaerating vessel is connected to the suction pipe of the feed pump 15, to the reserve feed tank 16 or conveniently as may be required, and the ejector 9 can be supplied with high pressure or exhaust steam, the discharge from the ejector being let into the auxiliary condenser or elsewhere.

The degassed or deaerated water may be passed through a surface heater 17 of usual form and this surface heater may be provided with a bypass pipe 18 controlled by valves 19 so that when desired the surface heater 17 can be cut out of circuit. In the drawings the arrows indicate the normal direction of flow.

It will of course be understood that the deaeration vessel may be provided with the usual adjuncts and accessories.

What I claim and desire to secure by Letters Patent is:—

1. Apparatus for removing gases from liquids comprising a vessel having an upper part constituting a direct contact condenser and a lower part constituting a surface heater, means for introducing the liquid to be treated into the upper part, means for causing said liquid to fall in a shower from the upper part on to the heated surface, said means extending from one side of the vessel to the other, an outlet for air in the upper part, said outlet being located above the liquid inlet whereby the incoming liquid operates by direct contact to condense liquid vapour rising with the air from the heated surface and permits the air to pass off to the air outlet.

2. Apparatus for removing gases from liquids comprising a vessel having an upper part and a lower part open to each other, a surface heated from an external source in its lower part, an outlet for the escape of liberated gases in the upper part, and an inlet for the liquid to be treated intermediate the gas outlet in said upper part and the heated surface, means for causing the admitted liquid to be projected in a shower on to the heated surface including a partition dividing the vessel into upper and lower compartments whereby gas is liberated by contact with the heated surface and condensible vapor and incondensible gas pass upwardly together through the incoming shower so that the vapor is re-condensed and the gas escapes.

3. Apparatus for removing gases from liquids comprising a vessel having an upper part and a lower part, an inlet into the top of said upper part through which the liquid to be degassed is introduced, a surface heated from an external source located in the lower part of said vessel, common means for projecting the liquid to be degassed evenly and in finely divided condition on to the heated surface and for the escape of all vapors resulting therefrom and an outlet for liberated air in the top of said upper part whereby vapor rising with the liberated air from the heated surface is recondensed and the air passes off.

4. Apparatus for removing gases from liquids comprising a vessel having an upper part of substantially circular plan and a lower part of substantially pear-shaped cross section, an inlet branch formed integral with and at the top of the upper part an inlet opening in said branch situated centrally of the upper part, a heated surface composed of horizontal tubes located in the lower part and adapted to be heated from an external source and a perforated screen located in the upper part and interposed between the centrally situated inlet opening and the heated surface whereby the water to be degassed is showered on to the heated surface, means for disposing of the liberated air and an outlet for the withdrawal of the degassed liquid.

5. Apparatus for removing gases from liquids comprising a vessel having an upper part constituting a direct contact condenser and a lower part constituting a surface heater, means for introducing the liquid to be treated into the upper part, common means for causing said liquid to fall in a shower from the upper part on to the heated surface and to cause contact between all the resulting vapors and ungassed liquid, an outlet for air in the upper part, said outlet being located above the liquid inlet whereby the incoming liquid operates by direct contact to condense liquid vapor rising with the air from the heated surface and permits the air to pass off to the air outlet, an outlet for the degassed liquid and a pipe connection leading from said outlet to the upper part of the vessel.

6. Apparatus for removing gases from liquids comprising a vessel having an upper part of substantially circular plan and a lower part of substantially pear-shaped cross section, an inlet branch formed integral with and at the top of the upper part, an inlet opening in said branch situated centrally of the upper part, a heated surface composed of horizontal tubes located in the lower part and adapted to be heated from an external source and a perforated screen located in the upper part and interposed between the centrally situated inlet opening and the heated surface whereby the water to be degassed is showered on to the heated surface, means for disposing of the liberated air, an outlet for the withdrawal of the degassed liquid, and a pipe connection between the outlet for the degassed liquid and the upper part of the vessel.

7. Apparatus for removing gases from liquids comprising a vertical cylindrical chamber into which the liquid to be treated is introduced in the form of a spray, a horizontal pear-shaped chamber immediately under said vertical chamber into which the liquid sprays on to a bank of steam tubes heated from an external source located within said pear-shaped chamber, the cross section of this bank of steam tubes constantly diminishing towards the bottom.

8. Apparatus for removing gases from liquids comprising a vertically disposed deaeration chamber, a perforated partition extending entirely across said chamber, a heated surface beneath said partition, means for projecting liquid to be treated on to said perforated partition, whence it flows through the perforations on to the heated surface, means for discharging or permitting the escape of the liberated gas and an outlet for the degassed liquid to pass from the vessel whereby the upwardly flowing gas and vapor intermingle with the down-flowing liquid.

9. Apparatus for removing gases from liquids comprising a vertically disposed deaeration chamber, a perforated conical partition extending completely across said chamber, a surface heated from an external source and located in a chamber below said conical partition, means for projecting liquid to be treated on to said perforated partition, whence it flows through the perforations onto the heated surface, means for discharging or permitting the escape of the liberated gas and an outlet for the degassed liquid to pass from the vessel whereby the upwardly flowing gas and vapor intermingle with the down-flowing steam.

10. A process of deaerating water which consists in dropping the water to be aerated on a surface heated to a temperature sufficiently higher than said water to liberate the gases and causing said gases to pass through the dropping water to remove any water vapor in the gases, and thereafter removing the gases.

In testimony whereof, I affix my signature.

HARRY FOTHERGILL.